United States Patent [19]

Harvey

[11] 4,240,461
[45] Dec. 23, 1980

[54] PIPE-FOLLOWING IRRIGATION MACHINE

[75] Inventor: Vernon B. W. Harvey, Wimborne, England

[73] Assignee: Wright Rain Limited, Hampshire, England

[21] Appl. No.: 2,227

[22] Filed: Jan. 9, 1979

[30] Foreign Application Priority Data

Mar. 14, 1978 [GB] United Kingdom ............... 9984/78

[51] Int. Cl.³ ............................................. B05B 3/18
[52] U.S. Cl. ................................. 137/899.1; 239/183; 239/184
[58] Field of Search ................ 137/344; 239/183, 184, 239/186, 187

[56] References Cited

U.S. PATENT DOCUMENTS

| | | | |
|---|---|---|---|
| 3,770,202 | 11/1973 | Ivemy et al. | 239/184 |
| 3,970,102 | 7/1976 | Harvey | 239/183 X |

Primary Examiner—Gerald A. Michalsky

Attorney, Agent, or Firm—Gifford, VanOphem, Sheridan & Sprinkle

[57] ABSTRACT

An irrigation machine guided to follow the course of a water supply pipe laid along the ground to be irrigated and having self-closing hydrants spaced apart along the length of the water supply pipe. The machine carries a vertically-movable riser pipe leading to an irrigation nozzle on the machine and arranged to be engaged automatically at its lower end to each of the hydrants in succession as the machine moves along the water supply pipe and stops with the riser pipe in vertical alignment with a hydrant. When the machine has stopped at a hydrant the riser pipe is automatically lowered to engage and to open the hydrant to admit water to the irrigation nozzle. The machine is supported on running wheels travelling along the top of the water supply pipe. To enable the wheels to pass over the hydrants without risk of the machine tipping over, the wheels are carried on a sub-frame which is pivotally-mounted about a horizontal axis on a main frame carrying the riser pipe and the irrigation nozzle.

8 Claims, 4 Drawing Figures

PIPE-FOLLOWING IRRIGATION MACHINE

The invention relates to an irrigation machine of the kind (hereinafter called the kind described) comprising a vehicle guided to follow the course of a water supply pipe having a plurality of self-closing hydrants spaced apart along the length of the water supply pipe, the vehicle carrying a vertically-movable riser pipe leading to an irrigation discharge device and which is arranged to be coupled at its lower end to each of at least some of the hydrants in succession and when so coupled to a hydrant to open a self-closing valve in the hydrant to permit water to flow through the riser pipe to the irrigation discharge device.

An irrigation machine of the foregoing kind is described in our U.S. Pat. No. 3,970,102 with reference to FIGS. 1 to 5 thereof. The irrigation machine described and illustrated therein has running wheels on which the vehicle is mounted to travel along an upper longitudinal surface of the water supply pipe and also guide means engageable with side surfaces of the water supply pipe to maintain the running wheels in running engagement with the upper longitudinal surface of the water supply pipe. Although the hydrants may be offset to one or other side of the longitudinal center line of the water supply pipe, the water supply pipe will usually include hydrants having their vertical axes arranged in upright planes in substantial alignment with the longitudinal center line of the water supply pipe. This means that whenever the vehicle reaches the position of a hydrant, the running wheels will have to ride over the housing of the hydrant which will inevitably project upwardly of the upper longitudinal surface of the water supply pipe. Where the running wheels are mounted rigidly with respect to the vehicle, the vehicle, which in the irrigation machine illustrated in FIGS. 1 to 5 of the aforesaid Specification is the whole irrigation machine, will be tipped in a fore-and-aft direction. This could lead to instability resulting in, possibly, toppling of the vehicle. Also the side guide means which are also mounted on the vehicle would be temporarily lifted above the side surfaces of the water supply pipe with which they are normally engageable, on tipping of the vehicle in the fore-and-aft direction, thereby to interrupt the guidance of the vehicle and, possibly, to permit the running wheels to leave the course of the longitudinal center line of the water supply pipe.

An object of the present invention is to provide an irrigation machine of the kind described and having at least one running wheel or equivalent endless track device to run along an upper longitudinal surface of the water supply pipe in which machine the foregoing disadvantages are avoided or the likelihood of their occurrence is reduced.

According to the present invention, the vehicle of the irrigation machine of the kind described includes a main frame, on which the riser pipe is mounted and which also carries the guide means, and a sub-frame carrying the running wheel or wheels or endless track device and pivotally attached to the main frame for pivoting about a sustantially horizontal axis.

By this arrangement, when the wheel, or one of the wheels, where there is more than one, or the endless track device, passes over a hydrant housing or any other protuberance extending above the upper longitudinal surface of the water supply pipe on which the wheel or endless track device is arranged to run, the sub-frame will pivot relatively to the main frame to permit vertical movement of the or each wheel or endless track device without tipping movement, or with only limited tipping movement of the main frame. In this way the tipping of the vehicle, or whole irrigation machine, except for the sub-frame, is avoided or reduced and also the side guide means are maintained adjacent the respective longitudinal side surfaces of the water supply pipe.

The vehicle, or whole irrigation machine, may be stabilised by a pair of ground-engaging wheels positioned one at each side of the water supply pipe at the trailing end of the vehicle or irrigation machine. In the irrigation machine described in the aforesaid Specification with reference to FIGS. 1 and 2 thereof, these stabilizing wheels are castor wheels individually swivellable but the supporting frame for these wheels is itself fixed with respect to the vehicle. In accordance with a feature of the present invention, a pair of trailing, ground-engaging stabilizing wheels is mounted on a further sub-frame which is mounted for pivoting with respect to the main frame about a substantially vertical axis. This feature aids the stabilization of the vehicle and permits the irrigation machine to travel along a water supply pipe, which in plan may define a curved course, with little risk of toppling.

An irrigation machine in accordance with the present invention is now described with reference to the accompanying diagrammatic drawings, in which.

The irrigation machine illustrated in FIGS. 1–4 hereof is similar in construction and operation to the irrigation machine illustrated in FIGS. 1–5 of the aforesaid Specification in at least the following respects. The machine comprises a vehicle which carries a vertically-movable riser pipe (not shown in the accompanying drawings) connected at its upper end to an irrigation gun or nozzle (not shown). The vehicle carries a pair of wheels 1 mounted in tandem and arranged to run on an upper portion of the surface of a water supply pipe 2 laid on the ground. The wheels 1 are driven by a motor (not shown). The wheels 1 are maintained in alignment with the longitudinal axis of the water supply pipe 2 by two pairs of side guide wheels 3A, 3B which are carried by the vehicle and are arranged on each side of the water supply pipe 2 to run along respective side surfaces of the pipe 2. The vehicle is maintained substantially upright by a pair of stabilizing wheels 4 which engage the ground on respective sides of the pipe 2 at the rear of the machine, i.e., at the left-hand side of FIG. 1.

Figure 1:
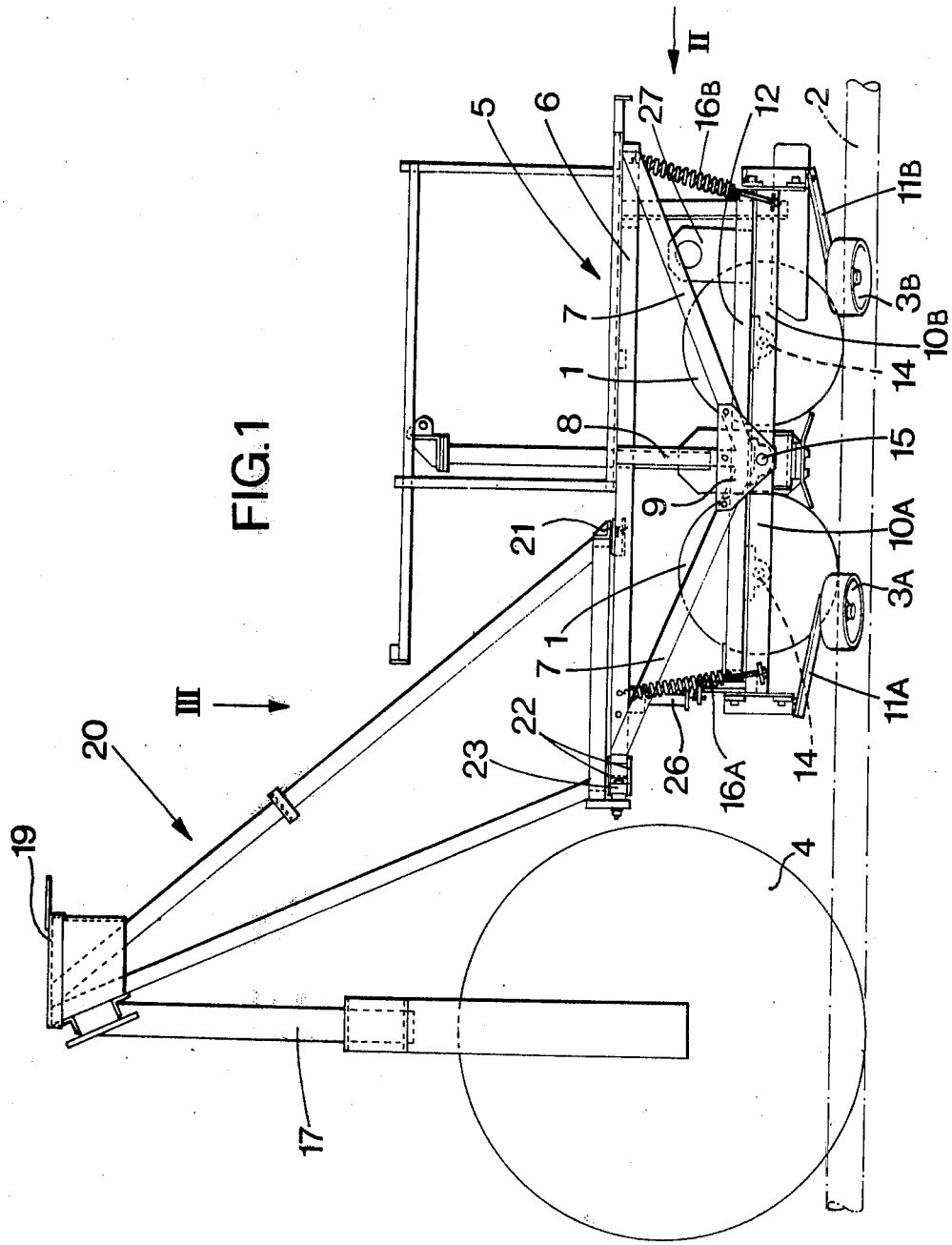
FIG. 1 is a side view of the machine showing the frame arrangement.
Figure 2:
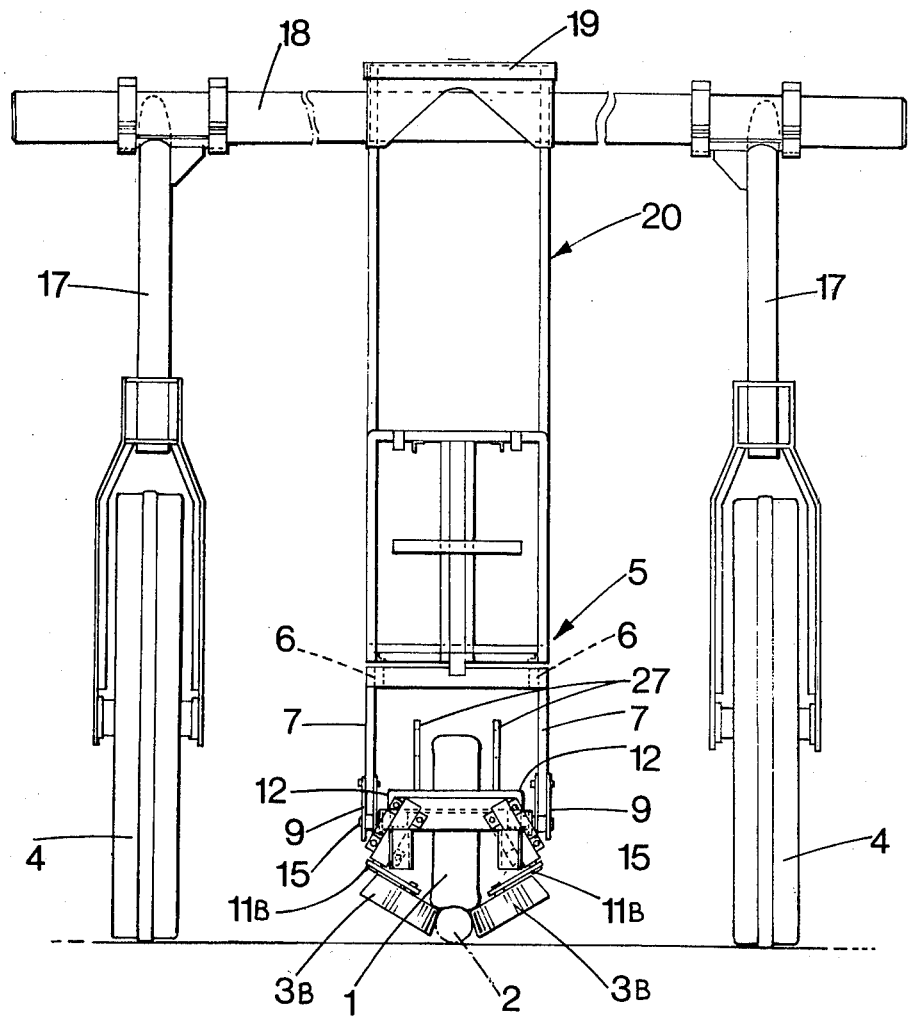
FIG. 2 is a front view of the machine in the direction of arrow II in FIG. 1.
Figure 4:
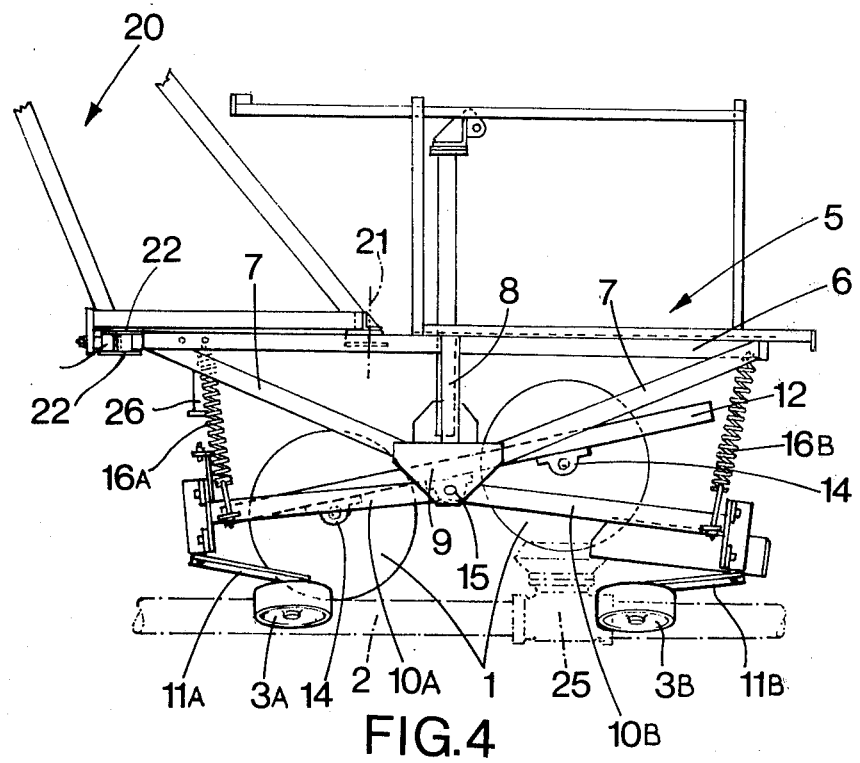
FIG. 4 is a view showing part of FIG. 1 in the position in which the leading wheel of a pair of running wheels is passing over a hydrant.

In accordance with the present invention the vehicle has a main frame, shown by arrow 5, in FIGS. 1, 2 and 4 which supports inter alia the driving motor for the wheels 1, the riser-pipe and a ram (not shown) for lowering and raising the riser pipe into and out of engagement with each of a plurality of self-closing hydrants (of which one is shown at 25 in FIG. 4) spaced apart along the length of the water supply pipe 2. The main frame has at each side thereof a main horizontal frame member 6 from which members 7, 8 extend downwardly to a pair of gusset plates 9. These support lower horizontal members 10A, 10B pivoted at 15 to each of the gusset plates 9. The members 10A, 10B each carry support members 11A, 11B respectively carrying the side guide wheels 3A, 3B. The latter are therefore supported with respect to the main frame 5 but with limited vertical movement permitted by the pivotal movement of the members 10A, 10B. The extent of this is controlled by stops 26 (in the case of the rear side guide wheels 3A) and by stabilising springs 16A, 16B connected between the respective members 10A, 10B and the main frame members 6.

The gusset plates 9 also provide at the pivot points 15, a transverse axis of pivoting for a sub-frame including inter alia side members 12 which carry bearings 14 for the axles of the wheels 1. The whole sub-frame being pivotable about the axis 15 permits the wheels to move vertically with respect to the main frame 5, for the purpose hereinafter explained. The sub-frame carries mounting brackets 27 for the driving motor (not shown) for the wheels 1. The mounting brackets 27 have been omitted in FIG. 4.

As aforesaid, the water supply pipe 2 has hydrants 25 spaced apart along its length. The machine travels along the pipe 2 and is stopped at each hydrant 25 in succession by means, as described in the aforesaid Specification, with the lower end of the riser pipe positioned vertically above the mouth of the respective hydrant to enable the riser pipe to be lowered into engagement with the hydrant to enable irrigation from that hydrant to commence. It is possible for the hydrants and the riser pipe to be offset to one side of the water supply pipe 2 as envisaged in the aforesaid Specification, but with the irrigation machine according to the present Application, the axis of the riser pipe is in alignment with the upright plane containing the wheels 1 and these are constrained by the side guide wheels 3 to run along an upright plane through the longitudinal center line of the water supply pipe 2. The water supply pipe 2 with which the irrigation machine is to be used is therefore provided with hydrants arranged centrally with respect to the longitudinal center line of the water supply pipe 2. Each hydrant has a housing to which sections of the water supply 2 are coupled and which extends above the upper portion of the surface of the water supply pipe 2 on which the wheels 1 run. Thus each time the irrigation machine reaches a hydrant, the leading wheel 1 will ride up over the hydrant housing and down again. The riser pipe is positioned with its vertical center line between the two wheels 1 and so the machine is arranged to be stopped after the leading wheel 1 has been re-engaged with the upper surface of the water supply pipe 2 after having ridden over the hydrant housing but before the trailing wheel 1 has engaged the hydrant housing. After irrigation at the respective hydrant has been completed and the riser pipe has disconnected therefrom and has been raised, the machine is driven forward and the trailing wheel 1 then rides over the hydrant housing and then re-engages with the upper surface of the water supply pipe 2. It will be appreciated therefore, that if the axles of the wheels 1 were supported rigidly with the main frame 5, the whole vehicle of the irrigation machine would be tipped in the fore-and-aft directions each time a wheel 1 rides over a hydrant housing. By mounting the wheels 1 on a sub-frame pivoted to the main frame 5 at axis 15, the sub-frame carrying the wheels 1 will be tipped in the fore-and-aft directions, each time a wheel 1 rides over a hydrant housing, but the main frame will remain substantially horizontal as each wheel 1 rides over a hydrant housing.

FIG. 4 shows diagrammatically how the leading wheel 1 rides over a hydrant 25 and the sub-frame tips, as indicated by the side members 12. The sub-frame will tip in the opposite direction, when the rear wheel 1 rides over a hydrant after irrigation therefrom. The springs 16A, 16B supports the side members 10A, 10B in their normal horizontal positions and extend as the leading wheel 1 rides over a hydrant housing. When the rear wheel 1 rides over a hydrant, the side guide wheel supports on the arms 10A are held down by the stops 26 which depend from the main frame 5. Thus the side guide wheels 3A and 3B are maintained in engagement with the pipe 2 when either of the wheels 1 rides over a hydrant and so the alignment of the irrigation machine with the longitudinal center line of the pipe 2 is not impaired. Each hydrant housing may have ramps for leading each wheel 1 from the upper surface of the water supply pipe 2 over the hydrant housing.

Figure 3:
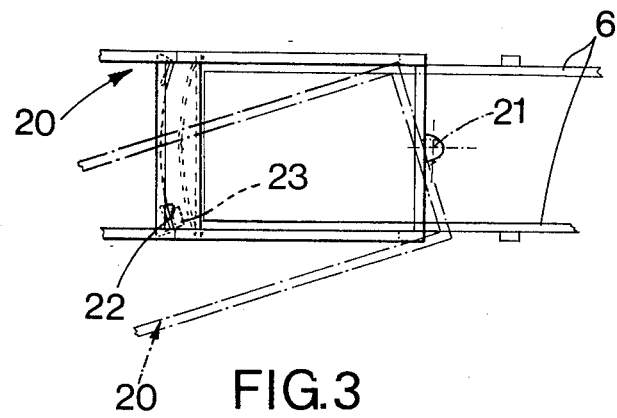
FIG. 3 is a plan view of a rearward part of the machine in the direction of arrow III in FIG. 1.

Another feature of the present invention is that the trailing stabilizing wheels 4 are supported by upright axle-supporting tubes 17 depending from a yoke member 18 supported by a platform 19 on which the irrigation nozzle or gun (not shown) is mounted. The platform 19 is mounted on a frame 20 which is mounted on the main frame 5 for free pivoting in horizontal directions about an upright pivot 21. The frame 20 is guided by a horizontal arcuate track 22 on the main frame 5 along which rollers 23 or balls carried by the frame 20 are constrained to run. The whole frame 20, including the platform 19, and the wheels 4 can therefore articulate about the upright pivot 21, as indicated in FIG. 3. This enables the irrigation machine to travel along a water supply pipe 2 which is arranged to define a curved course. The stabilising wheels 4 keep the machine stable and prevent it from toppling both when the vehicle is travelling along straight portions and curved portions of the water supply pipe 2.

The pair of wheels 1 in the illustrated irrigation machine may be replaced by a single wheel mounted on the pivoted sub-frame or by an equivalent endless track device or devices likewise mounted on the pivoted sub-frame.

What I claim as my invention and desire to secure by Letters Patent of the United States is:

1. An irrigation machine comprising a vehicle to be guided to follow the course of a water supply pipe having a plurality of self-closing hydrants spaced apart along the length of the water supply pipe in an upper longitudinal surface thereof; a vertically-movable riser pipe carried on said vehicle and leading to an irrigation discharge device; a coupling at the lower end of said riser pipe to be coupled to each of at least some of the hydrants in succession and when so coupled to a hydrant to open a self-closing valve in the hydrant to permit water to flow through the riser pipe to the irrigation device; said vehicle comprising a main frame on which said riser pipe is mounted; guide means on said main frame engaging both sides of said water supply pipe; a sub-frame pivotally attached to said main frame to pivot about a substantially horizontal axis relatively to said main frame and traction means carried on said sub-frame and engaging the upper longitudinal surface of said water supply pipe.

2. An irrigation machine as claimed in claim 1 in which said traction means comprises at least one wheel in running engagement with the upper longitudinal surface of said water supply pipe and rotatable about an axis parallel with the axis of pivoting of said sub-frame.

3. An irrigation machine as claimed in claim 1 in which said traction means comprises a pair of wheels mounted in tandem on said sub-frame; axles supporting said wheels, bearings carried on said sub-frame and supporting said axles fo rotation about parallel axes spaced apart longitudinally of said sub-frame and parallel to the axis of pivoting of said sub-frame, the latter located between the axes of said wheels in the longitudinal direction of said sub-frame and main frame.

4. An irrigation machine as claimed in claim 3 in which the guide means comprises at each side of said main frame a pair of side guide wheels positioned adjacent the leading and trailing ends of said main frame; a plurality of arms pivotally-mounted on said main frame and each supporting a respective side guide wheel in engagement with a respective side of the water supply pipe, said side guidewheel arms being pivotally mounted independently of said sub-frame and at each of the leading and trailing ends of said main frame being freely pivoted thereto, and a plurality of tension springs depending from said main frame and each supporting a respective side guide wheel arm at the outer end thereof with respect to its pivot on said main frame.

5. An irrigation machine as claimed in claim 4 including a pair of fixed stop members depending from said main frame adjacent the trailing ends of said trailing end side guide wheel arms, said trailing end side guide wheel arms engaging adjacent their trailing ends respective said fixed stop members when said wheel nearer to the trailing end of said sub-frame is riding over a hydrant in the water supply pipe.

6. An irrigation machine as claimed in claim 5 in which the pivotal axes of said side guide wheel support arms are coincident with the pivotal axis of said sub-frame on said main frame.

7. An irrigation machine as claimed in claim 1 including a further sub-frame pivotally mounted on said main frame for pivoting about a substantially vertical axis and a pair of trailing, ground-engaging stabilizing wheels mounted on said further sub-frame.

8. An irrigation machine as claimed in claim 7 including a fixed arcuate track on said main frame and centered on said substantially vertical axis, a plurality of bearing elements carried on said further sub-frame and guided for rolling movement along said fixed arcuate track.

* * * * *